United States Patent
Fukui et al.

(10) Patent No.: US 6,627,570 B2
(45) Date of Patent: *Sep. 30, 2003

(54) DIELECTRIC CERAMIC COMPOSITION, ELECTRONIC DEVICE, AND METHOD OF PRODUCING THE SAME

(75) Inventors: Takashi Fukui, Tokyo (JP); Yasuo Watanabe, Tokyo (JP); Mikio Takahashi, Tokyo (JP); Akira Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 71 days.

This patent is subject to a terminal disclaimer.

(21) Appl. No.: 09/778,735

(22) Filed: Feb. 8, 2001

(65) Prior Publication Data

US 2001/0018115 A1 Aug. 30, 2001

(30) Foreign Application Priority Data

Feb. 9, 2000 (JP) ........................................ 2000-031802
Jun. 22, 2000 (JP) ........................................ 2000-187799

(51) Int. Cl.⁷ ....................... C04B 35/465; C04B 35/47; H01G 4/008; H01G 4/10
(52) U.S. Cl. ................. 501/136; 361/321.2; 361/321.3; 361/321.4
(58) Field of Search ....................... 510/136; 361/321.2, 361/321.3, 321.4

(56) References Cited

U.S. PATENT DOCUMENTS

| | | | |
|---|---|---|---|
| 4,362,637 A | * 12/1982 | Matsuo et al. | 252/520.2 |
| 4,839,097 A | * 6/1989 | Noi et al. | 252/520.21 |
| 4,889,837 A | 12/1989 | Ono et al. | |
| 5,204,301 A | * 4/1993 | Ohkubo et al. | 501/135 |
| 6,118,648 A | * 9/2000 | Kojima et al. | 361/311 |
| 6,329,311 B1 | * 12/2001 | Fujii et al. | 361/321.4 |

FOREIGN PATENT DOCUMENTS

| | | |
|---|---|---|
| DE | 40 09 956 A1 | 10/1991 |
| EP | 0 244 300 | 11/1987 |
| JP | 50-50700 | 5/1975 |
| JP | 50-53899 | 5/1975 |
| JP | 50-23920 | 8/1975 |
| JP | 52 036750 A | 3/1977 |
| JP | 52 147799 A | 12/1977 |
| JP | 53-68899 | 6/1978 |
| JP | 53-75500 | 7/1978 |
| JP | 62-24388 B | 5/1987 |
| JP | 63-224109 A | 9/1988 |
| JP | 63-324108 A | 9/1988 |
| JP | 01 267906 A | 10/1989 |
| JP | 1-274411 | * 11/1989 |
| JP | 012 74411 A | 11/1989 |
| JP | 03 029208 A | 2/1991 |
| JP | 03-053407 | 3/1991 |
| JP | 03 053408 A | 3/1991 |
| JP | 03 237058 A | 10/1991 |
| JP | 04 202049 A | 7/1992 |
| JP | 4-206109 A | 7/1992 |
| JP | 5-18201 B | 3/1993 |
| JP | 06-243725 | 9/1994 |
| JP | 06-283028 | 10/1994 |
| JP | 07-211138 | 8/1995 |
| JP | 07-211140 | 8/1995 |
| JP | 8-24006 B2 | 3/1996 |
| JP | 2508359 B2 | 4/1996 |
| JP | 08 295560 A | 11/1996 |
| JP | 08-301657 | 11/1996 |
| JP | 08-301658 | 11/1996 |
| JP | 10-35169 | 12/1998 |
| JP | 11-106259 | 4/1999 |

* cited by examiner

Primary Examiner—David Brunsman
(74) Attorney, Agent, or Firm—Oliff & Berridge, PLC

(57) ABSTRACT

A dielectric ceramic composition comprising at least a main component containing a dielectric oxide of a composition expressed by $\{(Sr_{1-x}Ca_x)O\}_m \cdot (Ti_{1-y}Zr_y)O_2$ and a first subcomponent containing at least one type of compound selected from oxides of V, Nb, W, Ta, and Mo and/or compounds forming these oxides after firing, wherein the symbols m, x, and y showing the molar ratio of the composition in the formula contained in the main component are in relations of $0.94 < m < 1.08$, $0 \leq x \leq 1.00$, and $0 \leq y \leq 0.20$ and the ratio of the first subcomponent with respect to 100 moles of the main component, which is converted to the metal element in the oxide, is $0.01 \text{ mole} \leq \text{first subcomponent} < 2$ moles. According to this dielectric ceramic composition, it is possible to obtain a superior resistance to reduction at the time of firing, obtain a superior capacity-temperature characteristic after firing, and improve the accelerated life of the insulation resistance.

7 Claims, 10 Drawing Sheets

DIELECTRIC CERAMIC COMPOSITION, ELECTRONIC DEVICE, AND METHOD OF PRODUCING THE SAME

BACKGROUND OF THE INVENTION

1. Field of the Invention

The present invention relates to a dielectric ceramic composition used as a dielectric layer of a for example multilayer ceramic capacitor etc., an electronic device using this dielectric ceramic composition as a dielectric layer, and a method for producing the same.

2. Description of the Related Art

A multilayer ceramic capacitor, one example of an electronic device, is formed by printing a conductive paste on to a green sheet comprised of a predetermined dielectric ceramic composition, stacking a plurality of such green sheets printed with the ceramic paste, and firing the green sheets and internal electrodes together.

Conventional dielectric ceramic compositions had the property of being reduced and being made semiconductive by firing in a low oxygen partial pressure neutral or reducing atmosphere. Therefore, when producing a multilayer ceramic capacitor, one was forced to fire in a high oxygen partial pressure oxidizing atmosphere. Along with this, it was necessary to use, as the material of the internal electrodes fired simultaneously with the dielectric ceramic composition, an expensive precious metal which would not melt at the temperature of sintering of the dielectric ceramic composition and would not be oxidized even if fired under an oxidizing atmosphere (for example, palladium, platinum, etc.) This proved to be a major obstacle in reducing the price of the multilayer ceramic capacitors produced.

In the face of this, for use of an inexpensive base metal (for example, nickel, copper, etc.) as the material of the internal electrodes, it is necessary to develop a dielectric ceramic composition which does not become semiconductive even if fired under a neutral or reducing atmosphere at a low temperature, that is, is superior in resistance to reduction, and has a sufficient dielectric constant and superior dielectric characteristics (for example, small rate of change of temperature coefficient of capacitance) after firing.

In the past, various proposals have been made for dielectric ceramic compositions enabling use of a base metal for the material of the internal electrodes.

For example, Japanese Unexamined Patent Publication (Kokai) No. 1988-224108 discloses a dielectric ceramic composition containing as a main component a dielectric oxide of a composition expressed by $(Sr_{1-x}Ca_x)_m(Ti_{1-y}Zr_y)O_3$ (where, $0.30 \leq x \leq 0.50$, $0.03 \leq y \leq 0.20$, $0.95 \leq m \leq 1.08$) and containing as subcomponents, with respect to 100 parts by weight of this main component, 0.01 to 2.00 parts by weight of Mn converted to $MnO_2$ and 0.10 to 4.00 parts by weight of $SiO_2$.

Further, Japanese Unexamined Patent Publication (Kokai) No. 1988-224109 discloses a dielectric ceramic composition containing, with respect to the above main component, 0.01 to 1.00 part by weight of Zn in addition to the Mn and $SiO_2$.

Further, Japanese Unexamined Patent Publication (Kokai) No. 1992-206109 discloses a dielectric ceramic composition containing as a main component a dielectric oxide of a composition expressed by $(Sr_{1-x}Ca_x)_m(Ti_{1-y}Zr_y)O_3$ (where, $0.30 \leq x \leq 0.50$, $0.00 \leq y \leq 0.20$, $0.95 \leq m \leq 1.08$) and having a particle size of the powder in the range of 0.1 to 1.0 μm.

Further, Japanese Examined Patent Publication (Kokoku) No. 1987-24388 discloses a dielectric ceramic composition containing as a main component a dielectric oxide of a composition expressed by $(MeO)_k TiO_2$ (where, Me is a metal selected from Sr, Ca, and Sr+Ca and k is 1.00 to 1.04) and containing as a glass component, with respect to 100 parts by weight of this main component, 0.2 to 10.0 parts by weight of $Li_2O,M$ (where, M is at least one type of metal oxide selected from BaO, CaO, and SrO) and $SiO_2$ used in a predetermined molar ratio.

Further, Japanese Patent No. 2508359 (Japanese Unexamined Patent Publication (Kokai) No. 1992-14704) discloses a dielectric ceramic composition containing as a main component a dielectric oxide of a composition expressed by $(Sr_{1-x}Ca_x)_m(Ti_{1-y}Zr_y)O_3$ (where, $0.35 \leq x \leq 0.41$, $0 < y \leq 0.1$, m=1.00) and containing as subcomponents, with respect to 100 parts by weight of this main component, 0 part by weight to 3.0 parts by weight, exclusive, of $SiO_2$.

Further, Japanese Examined Patent Publication (Kokoku) No. 1993-18201 discloses a dielectric ceramic composition containing as a main component a dielectric oxide of a composition expressed by $(Sr_{1-x}Ca_x)_m(Ti_{1-y}Zr_y)O_3$ (where, $0<x<1.0$, $0.005 \leq y \leq 0.10$, $1.00 \leq m \leq 1.04$) and containing as subcomponents, with respect to 100 parts by weight of this main component, specific ranges of $Li_2O$, $SiO_2$, and MO (where, MO is at least one metal oxide selected from BaO, MgO, ZnO, SrO, and Ca).

Further, Japanese Examined Patent Publication (Kokoku) No. 1996-24006 (Japanese Unexamined Patent Publication (Kokai) No. 1988-224106) discloses a dielectric ceramic composition containing as a main component a dielectric oxide of a composition expressed by $(Sr_{1-x}Ca_x)_m(Ti_{1-y}Zr_y)O_3$ (where, $0.30 \leq x \leq 0.50$, $0.03 \leq y \leq 0.20$, $0.95 \leq m \leq 1.08$) and containing as subcomponents, with respect to 100 parts by weight of this main component, 0.01 to 2.00 parts by weight of Mn converted to $MnO_2$, 0.10 to 4.00 parts by weight of $SiO_2$, and 0.01 to 1.00 part by weight of MgO.

The dielectric ceramic compositions of these publications, however, all suffered from the problems of a short accelerated life of the insulation resistance after firing and of a lower reliability of the multilayer ceramic capacitor obtained when producing a multilayer ceramic capacitor using the dielectric ceramic compositions and having internal electrodes of nickel or another base metal.

SUMMARY OF THE INVENTION

A first object of the present invention is to provide a dielectric ceramic composition which is superior in resistance to reduction at the time of firing, has a superior capacity-temperature characteristic after firing, and enables an improvement in the accelerated life of the insulation resistance.

A second object of the present invention is to provide a chip capacitor or other electronic device having a superior capacity-temperature characteristic improved in accelerated life of the insulation resistance, and enhanced in reliability.

A third object of the present invention is to provide a method of producing an electronic device enabling improvement of the defect rate of the initial insulation resistance while maintaining the reliability sought for the electronic device.

To achieve the above first object, there is provided a dielectric ceramic composition comprising at least a main component containing a dielectric oxide of a composition expressed by $\{(Sr_{1-x}Ca_x)O\}_m \cdot (Ti_{1-y}Zr_y)O_2$ and a first subcomponent containing at least one type of compound selected from oxides of V, Nb, W, Ta, and Mo and/or compounds forming these oxides after firing, wherein the symbols m, x, and y showing the molar ratio of the composition in the formula contained in the main component are in relations of 0.94<m<1.08,
0≦x≦1.00, and
0≦y≦0.20 and the ratio of the first subcomponent with respect to 100 moles of the main component, which is converted to the metal element in the oxide, is 0.01 mole≦first subcomponent<2 moles.

Preferably, the dielectric ceramic composition according to the present invention further comprises a second subcomponent containing an oxide of Mn and/or a compound forming an oxide of Mn after firing, wherein the ratio of the second subcomponent with respect to 100 moles of the main component, which is converted to the metal element in the oxide, is 0 mole≦second subcomponent<4 moles.

Preferably, the dielectric ceramic composition according to the present invention further comprises a third subcomponent containing at least one type of compound selected from $SiO_2$, MO (where, M is at least one element selected from Ba, Ca, Sr, and Mg), $Li_2O$, and $B_2O_3$, wherein the ratio of the third subcomponent with respect to 100 moles of the main component, which is converted to oxide, is 0 mole<third subcomponent<15 moles.

Particularly preferred embodiments of the third subcomponent are as follows:

More preferably, the dielectric ceramic composition according to the present invention further comprises a third subcomponent $(Sr_p, Ca_{1-p})SiO_3$ (where, p is 0.3≦p≦1), wherein the ratio of the third subcomponent with respect to 100 moles of the main component, which is converted to oxide, is 0 mole<third subcomponent<15 moles. This type of third subcomponent is considered to function as a sintering aid.

Preferably, the dielectric ceramic composition according to the present invention further has a rate of change of the electrostatic capacity with respect to temperature ($\Delta C$) of −2000 to 0 ppm/° C. at least in the temperature range of 20 to 85° C., preferably −1500 to 0 ppm/° C., more preferably −1000 to 0 ppm/° C. Here, the reference temperature of the electrostatic capacity C is 20° C.

To achieve the above second object, according to the present invention, there is provided an electronic device having a dielectric layer, wherein the dielectric layer is comprised of a dielectric ceramic composition and the dielectric ceramic composition is comprised of any of the above dielectric ceramic compositions.

Preferably, the electronic device according to the present invention is provided with a capacitor device body comprised of the dielectric layers and internal electrode layers alternately stacked.

Preferably, the electronic device according to the present invention has a conductive material contained in the internal electrode layers comprised of nickel or a nickel alloy.

To achieve the third object, according to the present invention, there is provided a method of producing an electronic device comprising the steps of preparing a dielectric paste using any one of the above dielectric ceramic compositions; preparing a paste for internal electrodes; alternately stacking the dielectric paste and the internal electrode paste to obtain a multilayer body; firing the multilayer body to obtain a sintered body; and heat treating the sintered body in an atmosphere of an oxygen partial pressure of at least $10^{-4}$ Pa, more preferably $10^{-1}$ to 10 Pa.

Preferably, the method of producing an electronic device according to the present invention further comprises, in the firing step, firing the multilayer body in an atmosphere of an oxygen partial pressure of $10^{-10}$ to $10^{-3}$ Pa.

Preferably, the method of producing an electronic device according to the present invention uses nickel or a nickel alloy as the internal electrode paste.

Note that in the dielectric ceramic composition according to the present invention, each of the $SiO_2$, MO, $Li_2O$, $B_2O_3$, and $(Sr_p, Ca_{1-p})SiO_3$ contained in the third subcomponent should form the composition at least after firing. Compounds which form these oxides after firing are also included.

Effects

The dielectric ceramic composition according to the present invention, by adding a predetermined amount of a specific first subcomponent to a main component containing a dielectric oxide of a specific composition, is superior in the resistance to reduction at the time of firing, has a superior capacity-temperature characteristic after firing, and is improved in the accelerated life of the insulation resistance more than 1000-fold (for example, 175° C., DC8V/μm) compared with when not adding the first subcomponent.

The chip capacitor or other electronic device according to the present invention has a dielectric layer comprised of a dielectric ceramic composition according to the present invention, so has a superior temperature coefficient of capacitance (for example, satisfies the SL characteristic of the JIS standard) and is improved in the accelerated life of the insulation resistance and improved in the reliability of the electronic device.

The method of producing an electronic device according to the present invention has a step of heat treating a sintered body obtained by firing in an atmosphere of an oxygen partial pressure of at least $10^{-4}$ Pa, so can effectively improve the defect rate of the initial insulation resistance while maintaining the reliability sought for a chip capacitor or other electronic device.

The present disclosure relates to subject matter contained in Japanese Patent Application No. 2000-31802 (filed on February 9) and No. 2000-187799 (filed on June 22), the disclosure of which is expressly incorporated herein by reference in its entirety.

BRIEF DESCRIPTION OF THE DRAWINGS

These and other objects and features of the present invention will be explained in further detail with reference to the attached drawings, in which.

DESCRIPTION OF THE PREFERRED EMBODIMENTS

Figure 1:
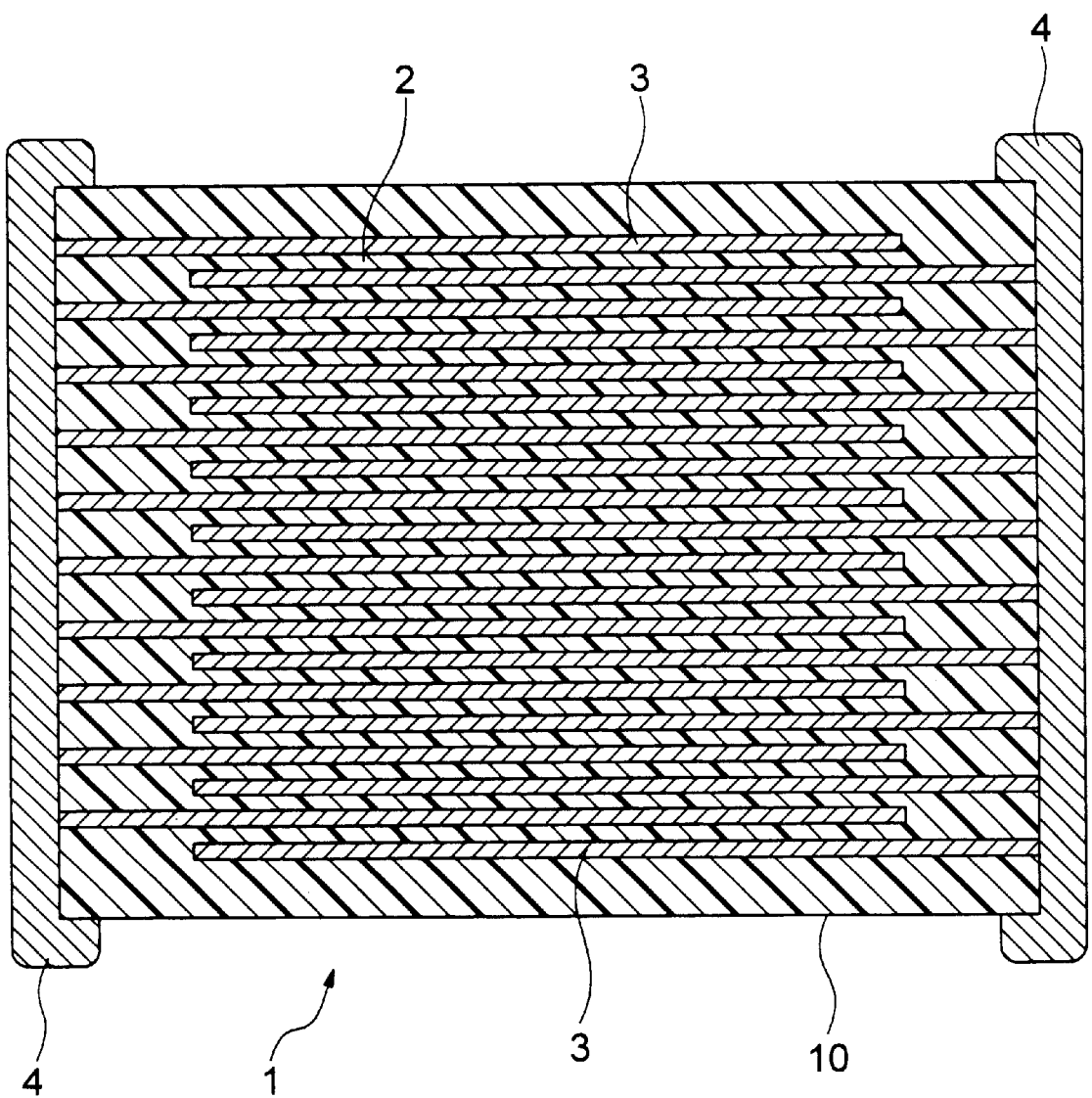
FIG. 1 is a sectional view of a multilayer ceramic capacitor according to a first embodiment of the present invention.

Next, the present invention will be explained based on the embodiments shown in the drawings.

Multilayer Ceramic Capacitor

As shown in FIG. 1, a multilayer ceramic capacitor 1, one electronic device according to an embodiment of the present invention, has a capacitor device body 10 of a configuration of dielectric layers 2 and internal electrode layers 3 stacked alternately. At the two ends of the capacitor device body 10 are formed a pair of external electrodes 4 conductive with the internal electrode layers 3 alternately arranged inside the device body 10. The shape of the capacitor device body 10 is not particularly limited, but normally is made a parallelopiped. Further, the dimensions are not particularly limited and may be made suitable dimensions in accordance with the application. Usually, however, they are (0.6 to 5.6 mm)×(0.3 to 5.0 mm)×(0.3 to 1.9 mm).

The internal electrode layers 3 are stacked so that end faces thereof alternately protrude out to the surfaces of the two opposing ends of the capacitor device body 10. The pair of external electrodes 4 are formed at the two ends of the capacitor device body 10 and are connected to the exposed end faces of the alternately arranged internal electrode layers 3 to form a capacitor circuit.

Dielectric Layers 2

Each of the dielectric layers 2 contains the dielectric ceramic composition of the present invention.

The dielectric ceramic composition of the present invention has at least a main component expressed by the formula $\{(Sr_{1-x}Ca_x)O\}_m \cdot (Ti_{1-y}Zr_y)O_2$ and at least one type of compound selected from an oxide of V, Nb, W, Ta, and Mo and/or compounds forming these oxides after firing. At that time, the amount of oxygen (O) may deviate somewhat from the stoichiochemical composition of the above formula.

In the above formula, the x is $0 \leq x \leq 1.00$, preferably $0.30 \leq x \leq 0.50$. The x indicates the number of Ca atoms. By changing x, that is, the Ca/Sr ratio, it becomes possible to make the phase transition point of the crystal shift as desired. Therefore, it is possible to control the capacity-temperature coefficient and the dielectric constant as desired. If x is made one in the above range, the phase transition point of the crystal is present near room temperature and the temperature characteristic of the electrostatic capacity can be improved. In the present invention, however, the ratio of S and Ca may be any ratio. It is also possible to include only one of these.

In the above formula, y is $0 \leq y \leq 0.20$, preferably $0 \leq y \leq 0.10$. By making y not more than 0.20, a reduction in the dielectric constant can be prevented. y indicates the number of Zr atoms. By substituting $ZrO_2$, which is harder to reduce than $TiO_2$, the resistance to reduction tends to be further increased. In the present invention, however, Zr does not necessarily have to be included. It is also possible to include only Ti.

In the above formula, m is 0.94<m<1.08, preferably $0.970 \leq m \leq 1.030$. By making m larger than 0.94, the composition is prevented from becoming semiconductive during firing in the reducing atmosphere. By making m less than 1.08, it is possible to obtain a dense sintered body even without making the firing temperature high.

The point of difference of the dielectric ceramic composition of the present invention from the dielectric ceramic compositions of the related art lies in the addition of a predetermined amount of a predetermined first subcomponent in a range of m of 0.94<m<1.08. By adding a predetermined amount of a predetermined first subcomponent, low temperature firing becomes possible without inducing a deterioration in the dielectric characteristics in the range of an m of the main component of 0.94<m<1.08, the accelerated life of the insulation resistance (for example, the highly accelerated life time (HALT)) can be improved even when making the dielectric layers thin, and the reliability can be greatly improved. As a result, the capacitor can be made smaller in size and higher in capacity.

In the present invention, the first subcomponent includes at least one type of compound selected from an oxide of V, Nb, W, Ta, and Mo and/or a compound forming such an oxide after firing. The first subcomponent acts as a substance which reduces the sintering temperature and improves the accelerated life of the insulation resistance.

In the present invention, the ratio of the first subcomponent to 100 moles of the main component is, converted to metal element in the oxide, 0.01 mole≦first subcomponent<2 moles, preferably 0.04 mole≦first subcomponent≦0.6 mole. By making the ratio of the first subcomponent in the range of 0.01 mole≦first subcomponent<2 moles converted to metal element in the oxide, the accelerated life of the insulation resistance can be improved in the range of m of 0.94<m<1.08.

Preferably, as the first subcomponent, an oxide of V and/or a compound forming an oxide of V after firing is included in an amount, converted to V, of at least 0.01 mole and less than 2 moles, preferably at least 0.04 mole and not more than 0.6 mole. Inclusion of this specific first subcomponent in the above range is effective for improving the highly accelerated life time.

Further, in the dielectric ceramic composition according to the present invention, preferably a second subcomponent including an oxide of M (for example, MnO) and/or a compound forming an oxide of MnO after firing (for example, $MnCO_3$) is further added. This second subcomponent has the effect of promoting sintering and improving the highly accelerated life time and further has the effect of reducing the defect rate of the initial insulation resistance when making the dielectric layers 2 a thin for example 4 μm or so.

The ratio of the second subcomponent to 100 moles of the main component is, converted to metal element in the oxide, 0 mole≦second subcomponent<4 moles, preferably 0.05 mole≦second subcomponent≦1.4 moles. If the amount of the second subcomponent added is more than 4 moles, the initial insulation resistance tends to be unobtainable. In the range of addition of the second subcomponent of 0 mole≦second subcomponent<4 moles, the higher the amount added, the better the highly accelerated life time and the more the defect rate of the initial insulation resistance can be lowered. The smaller the amount added, the smaller the rate of change of the temperature coefficient of capacitance can be made.

Further, in the dielectric ceramic composition according to the present invention, preferably a third subcomponent containing at least one compound selected from $SiO_2$, MO (where M is at least one element selected from Ba, Ca, Sr, and Mg), $Li_2O$, and $B_2O_3$ is further added. This third subcomponent acts mainly as a sintering aid, but also has the effect of improving the defect rate of the initial insulation resistance when making the layers thin. From the viewpoint of improvement of the defect rate, it is further preferable to include $Li_2O$. Further, from the viewpoint of improvement of the defect rate, it is more preferable to include $(Sr_p, Ca_{1-p})SiO_3$. In this case, p is $0.3 \leq p \leq 1$, preferably $0.5 \leq p \leq 1$.

p indicates the number of Sr atoms. By increasing the value of this p, it becomes possible to improve the defect rate of the initial insulation resistance.

The ratio of the third subcomponent to 100 moles of the main component, converted to oxide, is 0 mole<third component<15 moles, preferably $0.2$ mole$\leq$third subcomponent$\leq 6$ moles. Making the amount of the third subcomponent added greater than 0 mole is effective for improving the sinterability. Making the amount added less than 15 moles keeps down the dielectric constant and ensures a sufficient capacity.

Still further, the dielectric ceramic composition according to the present invention preferably has further added to it a fourth subcomponent containing an oxide of R (where R is at least one element selected from Sc, Y, La, Ce, Pr, Nd, Pm, Sm, Eu, Gd, Tb, Dy, Ho, Er, Tm, Yb, and Lu). The fourth subcomponent has the effect of improving the defect rate of the initial insulation resistance at the time of making the layers thin in addition to the effect of improving the highly accelerated life time. From the viewpoint of improvement of the defect rate, it is more preferable to further include at least one oxide of Sc, Y, Ce, Dy, Ho, Er, Tm, Yb, and Lu.

When adding the fourth subcomponent, the ratio of the fourth subcomponent to 100 moles of the main component, converted to R in the oxide, is $0.02$ mole$\leq$fourth subcomponent<2 moles, preferably $0.02$ mole$\leq$fourth subcomponent$\leq 0.6$ mole.

Note that the number of layers, thickness, and other various conditions of the dielectric layers 2 shown in FIG. 1 may be suitably determined in accordance with the object and application. Further, the dielectric layers 2 are comprised of grains and grain interfaces. The mean particle size of the grains of the dielectric layers 2 is preferably 1 to 5 $\mu$m or so. The grain interfaces are usually comprised of glass or glassy substances usually comprised of oxides of the materials making up the dielectric layers or internal electrode layers, oxides of separately added substances, and oxides of materials intermixed as impurities in the process.

Internal Electrode Layers 3

The electroconductive material contained in the internal electrode layers 3 is not particularly limited, but a base metal may be used since the material constituting the dielectric layers 2 has resistance to reduction. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt %. Note that the Ni or Ni alloy may contain P, Fe, Mg, and other various types of trace components in amounts of not more than 0.1 wt % or so.

The thickness of the internal electrode layers may be suitably determined in accordance with the application etc., but is usually 0.5 to 5 $\mu$m, preferably 0.5 to 2.5 $\mu$m, more preferably 1 to 2.5 $\mu$m or so.

External Electrodes 4

The electroconductive material contained in the external electrodes 4 is not particularly limited, but usually Cu or a Cu alloy or Ni or an Ni alloy is used. Note that Ag or an Ag—Pd alloy etc. may of course also be used. Note that in the present embodiment, an inexpensive Ni, Cu, or alloys of the same are used. The thickness of the external electrodes may be suitably determined in accordance with the application etc., but is usually 10 to 50 $\mu$m or so.

Method of Manufacturing Multilayer Ceramic Capacitor

The multilayer ceramic capacitor using the dielectric ceramic composition of the present invention is produced in the same way as a multilayer ceramic capacitor of the related art by preparing a green chip using the usual printing method or sheet method which uses pastes, firing the green chip, then printing or transferring the external electrodes and firing. The method of manufacture will be explained in detail below.

First, the dielectric layer paste, internal electrode paste, and external electrode paste are produced.

Dielectric Layer Paste

The dielectric layer paste may be an organic-based coating obtained by kneading a dielectric ingredient and an organic vehicle and may be a water-based coating.

The dielectric ingredient used is comprised of ingredients making up the main component and ingredients making up the first to fourth subcomponents in accordance with the composition of the dielectric ceramic composition according to the present invention explained above.

As the ingredient making up the main component, use is made of oxides of Sr, Ca, Ti, and Zr and/or compounds forming these oxides upon firing.

As the ingredient making up the first subcomponent, use is made of at least one type of single oxide or composite oxide selected from oxides of V, Nb, W, Ta, and Mo and/or compounds forming these oxides upon firing.

As the ingredient making up the second subcomponent, use is made of a single oxide or composite oxide of an oxide of Mn and/or a compound forming an oxide of Mn upon firing.

As the ingredient making up the third subcomponent, use is made of at least one type of compound selected from $SiO_2$, MO (where, M is at least one type of element selected from Ba, Ca, Sr, and Mg), $Li_2O$, and $B_2O_3$.

As the ingredient making up the fourth subcomponent, use is made of an oxide of R (where, R is at least one element selected from Sc, Y, La, Ce, Pr, Nd, Pm, Sm, Eu, Gd, Tb, Dy, Ho, Er, Tm, Yb, and Lu).

Note that as the compounds forming oxides upon firing, mention may be made of carbonates, nitrates, oxalates, organometallic compounds, etc. Of course, it is also possible to together use an oxide and a compound forming such an oxide upon firing. The contents of the compounds in the dielectric ingredient should be determined to give the above composition of the dielectric ceramic composition after firing. A powder of the ingredient usually has a mean particle size of 0.0005 to 5 μm or so.

The organic vehicle is comprised of a binder dissolved in an organic solvent. The binder used for the organic vehicle is not particularly limited, but may be suitably selected from ethyl cellulose, polyvinyl butyrate, and other ordinary types of binders. Further, the organic solvent used is also not particularly limited and may be suitably selected from terpineol, butyl carbitol, acetone, toluene, and other organic solvents in accordance with the printing method, sheet method, or other method of use.

Further, the water-based coating is comprised of a water-soluble binder, dispersant, etc. dissolved in water. The water-soluble binder is not particularly limited and may be suitably selected from for example, a polyvinyl alcohol, cellulose, water-based acrylic resin, etc.

Internal Electrode Paste and External Electrode Paste

The internal electrode layer paste is prepared by kneading the electroconductive material comprised of the above various types of conductive metals and alloys or various types of oxides forming the above electroconductive materials after firing, an organometallic compound, resinate, etc. (electroconductive material) together with the above organic vehicle. The external electrode paste is prepared in the same way as the internal electrode paste.

The content of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc.

When using a printing method, the dielectric layer paste and the internal electrode layer paste are successively printed on the polyethylene terephthalate or other substrate. The result is then cut into a predetermined shape, then the pastes are peeled off from the substrate to form a green chip. As opposed to this, when using a sheet method, a dielectric layer paste is used to form a green sheet, the internal electrode layer paste is printed on top of this, then these are stacked to form a green chip.

Next, the green chip is processed to remove the binder and is fired.

Processing to Remove Binder

The processing for removing the binder may be performed under ordinary conditions. If Ni or an Ni alloy or another base metal is used for the electroconductive material of the internal electrode layers, the processing is performed in the air at a rate of temperature rise of 5 to 300° C./hour, more preferably 10 to 100° C./hour, a holding temperature of 180 to 400° C., more preferably 200 to 300° C., and a temperature holding time of 0.5 to 24 hours, more preferably 5 to 20 hours.

Firing

The atmosphere when firing the green chip may be suitably determined in accordance with the type of the electroconductive material in the internal electrode layer paste, but when using Ni or an Ni alloy or another base metal as the electroconductive material, the oxygen partial pressure in the firing atmosphere is preferably made $10^{-10}$ to $10^{-3}$ Pa, more preferably $10^{-10}$ to $6\times10^{-5}$ Pa. If the oxygen partial pressure at the time of firing is too low, the electroconductive material of the internal electrodes becomes abnormally sintered and ends up breaking in the middle. If the oxygen partial pressure is too high, the internal electrodes are liable to be oxidized. In particular, by adjusting the oxygen partial pressure to $10^{-10}$ to $6\times10^{-5}$ Pa, it is possible to give a superior capacity-temperature characteristic, improve the accelerated life of the insulation resistance, and enhance the reliability of the resultant multilayer ceramic capacitor 1.

The holding temperature at the time of firing is 1000 to 1400° C., more preferably 1200 to 1380° C. If the holding temperature is too low, the densification becomes insufficient, while if the holding temperature is too high, the electrodes break in the middle due to abnormal sintering of the internal electrodes or the capacity-temperature characteristic deteriorates due to dispersion of the material comprising the internal electrodes.

The other firing conditions are a rate of temperature rise of 50 to 500° C./hour, more preferably 200 to 300° C./hour, a temperature holding time of 0.5 to 8 hours, more preferably 1 to 3 hours, and a cooling rate of 50 to 500° C./hour, more preferably 200 to 300° C./hour. The firing atmosphere is preferably made a reducing atmosphere. As the atmospheric gas, for example, it is preferable to use a wet mixed gas of nitrogen gas and hydrogen gas.

When firing in a reducing atmosphere, the capacitor device body is preferably annealed.

Annealing (Heat Treatment)

The annealing is for reoxidizing the dielectric layers. This enables the insulation resistance to be increased. The oxygen partial pressure in the annealing atmosphere is preferably at least $10^{-4}$ Pa, more preferably $10^{-1}$ to 10 Pa. If the oxygen partial pressure is too low, reoxidation of the dielectric layers is difficult, while if the oxygen partial pressure is too high, the internal electrode layers 3 are liable to be oxidized. In particular, when heat treating the sintered body obtained by firing the dielectric ceramic composition of the present invention, by adjusting the oxygen partial pressure to the range of $10^{-1}$ to 10 Pa, there is a much greater effect of improvement of the defect rate of the initial insulation resistance.

The holding temperature at the time of annealing is not more than 1100° C., more preferably 500 to 1100° C. If the holding temperature is too low, the reoxidation of the dielectric layers becomes insufficient, so the insulation resistance tends to deteriorate and the accelerated life tends to also become short. Further, if the holding temperature is too high, not only do the internal electrode layers oxidize and the capacity fall, but also the internal electrode layers end up reacting with the dielectric material resulting in a tendency toward deterioration of the capacity-temperature characteristic, the insulation resistance, and its accelerated life. Note that the annealing may be comprised of only a temperature raising process and temperature lowering process. In this case, the temperature holding time is zero and the holding temperature is synonymous with the maximum temperature.

Other annealing conditions are preferably a temperature holding time of 0 to 20 hours, more preferably 6 to 10 hours, and a cooling rate of 50 to 500° C./hour, more preferably 100 to 300° C./hour. As the atmospheric gas for the annealing, for example wet nitrogen gas may be used.

Note that in the same way as the above firing, in the processing for removing the binder and the annealing process, to wet the nitrogen gas or mixed gas, it is possible to use for example a wetter. The water temperature in this case is preferably 5 to 75° C.

The processing for removing the binder, firing, and annealing may be performed consecutively or independently. When performing these consecutively, preferably, after processing to remove the binder, the atmosphere is changed without cooling, then the temperature is raised to the holding temperature for firing, the firing performed, then the chip is cooled, the atmosphere is changed when the holding temperature of the annealing is reached, and then annealing is performed. On the other hand, when performing these independently, at the time of firing, preferably the temperature is raised to the holding temperature at the time of the processing for removing the binder in a nitrogen gas or wet nitrogen gas atmosphere, then the atmosphere is changed and the temperature is further raised. Preferably, the chip is cooled to the holding temperature of the annealing, then the atmosphere changed again to a nitrogen gas or wet nitrogen gas atmosphere and the cooling continued. Further, at the time of annealing, the temperature may be raised to the holding temperature in a nitrogen gas atmosphere, then the atmosphere changed or the entire annealing process may be performed in a wet nitrogen gas atmosphere.

The thus obtained capacitor fired body is, for example, end polished using barrel polishing or sandblasting etc., then printed or transferred with an external electrode paste and fired to form the external electrodes 4. The firing conditions of the external electrode paste are for example preferably 600 to 800° C. for 10 minutes to 1 hour or so in a wet mixed gas of nitrogen and hydrogen. Further, in accordance with need, the surfaces of the external electrodes 4 may be formed with a covering layer (pad layer) using a plating technique etc.

The thus produced multilayer ceramic capacitor 1 of the present invention is mounted by soldering it onto a printed circuit board for use in various types of electronic equipment.

An embodiment of the present invention was explained above, but the present invention is not limited to the above embodiment in any way and may be modified in various ways within the scope of the invention.

For example, in the above embodiment, a multilayer ceramic capacitor was illustrated as an electronic device according to the present invention, but the invention is not limited to a multilayer ceramic capacitor. It may be any device having a dielectric layer comprised of a dielectric ceramic composition of the above composition.

Next, the present invention will be explained in further detail by giving more specific examples of the present invention. The present invention is not however limited to these examples.

EXAMPLE 1

First, as the starting ingredients for preparing the dielectric material, the main component ingredients of average particle sizes of 0.1 to 1 μm ($SrCO_3$, $CaCO_3$, $TiO_2$, and $ZrO_2$) and the first to fourth subcomponent ingredients were prepared. For the ingredient of MnO, a carbonate (second subcomponent: $MnCO_3$) was used. For the other ingredients, oxides (first subcomponent: $V_2O_5$, third subcomponent: $SiO_2+CaO$, and fourth subcomponent: $Y_2O_3$) were used. Note that for the third subcomponent, that is, $SiO_2+CaO$, similar characteristics were obtained even when using $CaSiO_3$ obtained by wet mixing $SiO_2$ and CaO by a ball mill for 16 hours, drying the mixture, then firing it at 1150° C. in the air and then further wet pulverizing the result by a ball mill for 100 hours.

These ingredients were weighed so that the compositions after firing in the formula $\{(Sr_{1-x}Ca_x)O\}_m \cdot (Ti_{1-y}Zr_y)O_2$ (main component)+$V_2O_5$ (first subcomponent)+$MnCO_3$ (second subcomponent)+$(SiO_2+CaO)$ (third subcomponent)+$Y_2O_3$ (fourth subcomponent) became the percent compositions shown for Samples 1 to 17 of Table 1 to Table 3, then they were wet mixed by a ball mill for about 16 hours and then dried to obtain dielectric ceramic compositions (dielectric materials).

In each case, 100 parts by weight of the thus obtained dried dielectric ingredients, 4.8 parts by weight of an acrylic resin, 40 parts by weight of methylene chloride, 20 parts by weight of ethyl acetate, 6 parts by weight of mineral spirits, and 4 parts by weight of acetone were mixed by a ball mill to make a paste and thereby obtain a dielectric layer paste.

Next, 100 parts by weight of Ni particles having an average particle size of 0.2 to 0.8 μm, 40 parts by weight of an organic vehicle (8 parts by weight of ethyl cellulose dissolved in 92 parts by weight of butyl carbitol), and 10 parts by weight of butyl carbitol were kneaded by a triple roll to make a paste and thereby obtain an internal electrode layer paste.

Next, 100 parts by weight of Cu particles having an average particle size of 0.5 μm, 35 parts by weight of an organic vehicle (8 parts by weight of ethyl cellulose dissolved in 92 parts by weight of butyl carbitol), and 7 parts by weight of butyl carbitol were kneaded to make a paste and thereby obtain an external electrode paste.

Next, a green sheet of a thickness of 6 μm was formed on a PET film using the above dielectric layer paste, the internal electrode layer paste was printed on this, then the green sheet was peeled off from the PET film. Next, such green sheets were stacked with protective green sheets (not printed with internal electrode layer paste) and these pressed to obtain a green chip. Four sheets having internal electrodes were stacked.

Next, the green chip was cut into a predetermined size, processed to remove the binder, fired, and annealed (heat treated) so as to obtain a multilayer ceramic fired body. The processing for removing the binder was performed under conditions of a rate of temperature rise of 15° C./hour, a holding temperature of 280° C., a holding time of 8 hours, and an air atmosphere. Further, the firing was conducted under conditions of a rate of temperature rise of 200° C./hour, a holding temperature of 1200 to 1380° C., a holding time of 2 hours, a cooling rate of 300° C./hour, and a wet $N_2+H_2$ mixed gas atmosphere (oxygen partial pressure adjusted to within $2\times10^{-7}$ to $5\times10^{-4}$ Pa). The annealing was carried out under conditions of a holding temperature of 900° C., a holding time of 9 hours, a cooling rate of 300° C./hour, and a wet $N_2$ gas atmosphere (oxygen partial pressure of $3.54\times10^{-2}$ Pa). Note that for the wetting of the atmospheric gas during the firing and the annealing, a wetter etc. of a water temperature of 35° C. was used.

Next, the end surfaces of the multilayer ceramic fired body were polished by sandblasting, then the external electrode paste was transferred to the end surfaces and the result fired in a wet $N_2+H_2$ atmosphere at 800° C. for 10 minutes to form the external electrodes and thereby obtain a sample of the multilayer ceramic capacitor of the configuration shown in FIG. 1.

The size of each of the thus obtained samples was 3.2 mm×1.6 mm×0.6 mm, four dielectric layers were stacked via internal electrode layers, the thickness of the dielectric layers was 4 µm, and the thickness of the internal electrode layers was 2 µm. Each sample was evaluated for the following characteristics.

Dielectric Constant (∈) and Insulation Resistance (IR)

The electrostatic capacity of each of the samples of the capacitors was measured under conditions of a frequency of 1 kHz and an input signal level (measurement voltage) of 1 Vrms at a reference temperature of 25° C. by a digital LCR meter (4274A made by YHP). Further, the relative dielectric constant (no unit) was calculated from the obtained electrostatic capacity, electrode dimensions of the capacitor sample, and thickness of dielectric layers.

Next, using an insulation resistance meter (R8340A made by Advantest), the insulation resistance IR after applying 50 V DC to the capacitor sample at 25° C. for 60 seconds was measured. The specific resistance ρ (unit: Ωcm) was calculated from the measured value and the electrode area and thickness of the dielectric layers. The results are shown in Table 1 to Table 3.

For evaluation, the dielectric constant ∈ is important for preparing a small sized high dielectric constant capacitor. One of at least 180, more preferably at least 200, is considered good. The specific resistance of at least $1 \times 10^{12}$ Ωcm is considered good. The dielectric constant ∈ was defined as the averages of 10 capacitors of each sample. The specific resistance ρ was defined as the averages of 10 capacitors of good sample.

Temperature Characteristic of Electrostatic Capacity

The electrostatic capacity at 1 kHz and a voltage of 1 V was measured for each sample of the capacitors. It was investigated if the rate of change of the electrostatic capacity with respect to temperature was −2000 to 0 ppm/° C. in a temperature range of 20 to 85° C. when making the reference temperature 20° C. The results are shown in Table 1 to Table 3.

The rate of change of capacity ΔC85/C20 (ppm/° C.) was calculated according to equation 1:

$$\Delta C85/C20 = \{(C85-C20)/C20\} \times (1/65) \quad (1)$$

where, C85 is the electrostatic capacity at 85° C. and C20 is the electrostatic capacity at 20° C.

Figure 2:
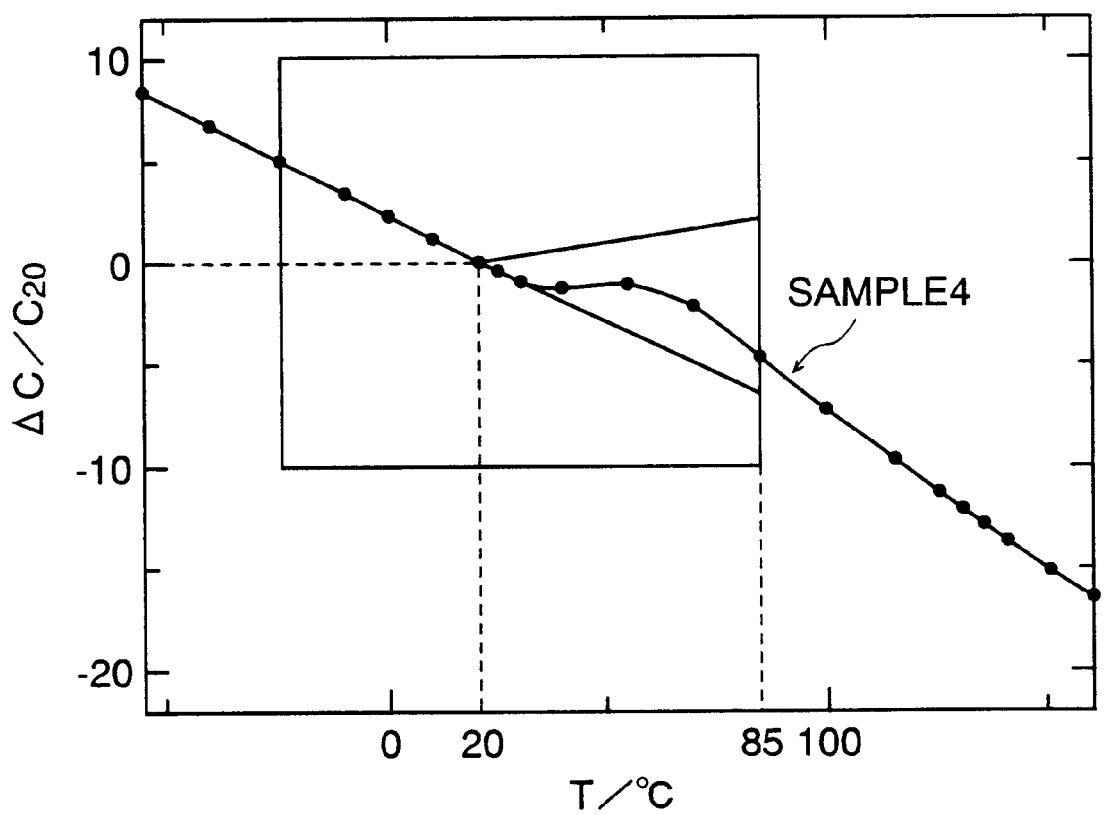
FIG. 2 is a graph of the capacity-temperature characteristic of Sample 4 according to an embodiment of the present invention.

The rate of change of capacity ΔC/C in the temperature range of −50° C. to +150° C. was measured for Sample 4 representing the present embodiment and the result graphed in FIG. 2. The figure shows the rate of change based on the capacity at 20° C. As clear from the figure, a good capacity-temperature characteristic is shown.

HALT (Highly Accelerated Life Time)

The highly accelerated life time of each sample of the capacitors was measured by holding the sample at 175° C. while applying a DC voltage of 8 V/µm. The highly accelerated life time was evaluated by measuring the average life for 10 capacitors of each sample (4 µm thickness of dielectric layer). The results are shown in Table 1 to Table 3.

For evaluation, the highly accelerated life time is particularly important when making the dielectric layers thin. The time from the start of application of the voltage to when the resistance fell by one order was defined as the life.

Figure 3:
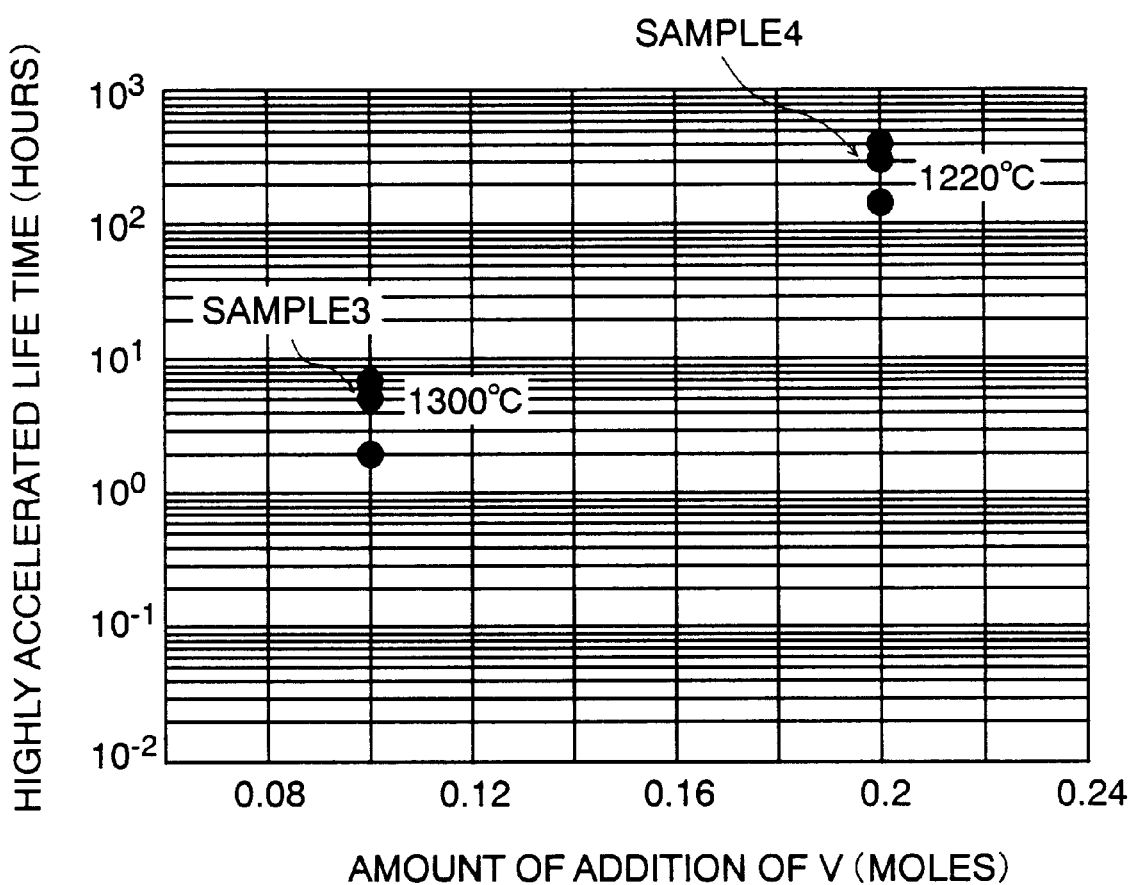
FIG. 3 is a graph of the relation between the amount of V added and the highly accelerated life time in Samples 3 and 4 according to embodiments of the present invention.

The relation between the amount of the $V_2O_5$ added (converted to V) and the highly accelerated life time in Samples 3 and 4 of embodiments of the present invention (in both of which, m=0.985) is shown in FIG. 3. As will be understood from the figure, when the amount of V added increases and becomes 0.2 mole, the life is an average 184 hours, i.e., the reliability of the capacitor is higher than when the amount added is small. Further, it could be confirmed that the life was improved over 2000-fold compared with 0 mole added.

Figure 4:
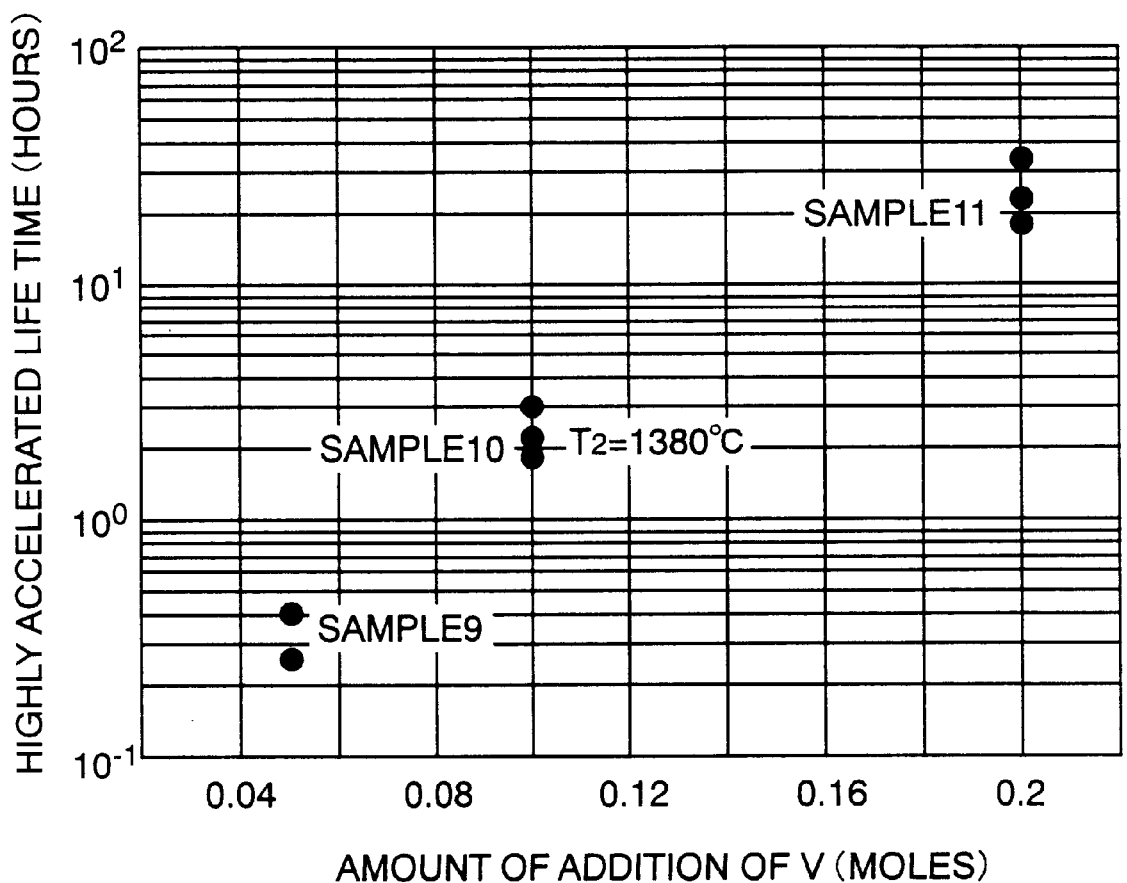
FIG. 4 is a graph of the relation between the amount of V added and the highly accelerated life time in Samples 9 to 11 according to embodiments of the present invention.

Further, the relation between the amount of the $V_2O_5$ added (converted to V) and the highly accelerated life time in Samples 9 and 11 of embodiments of the present invention (in each of which, m=1.02) is shown in FIG. 4. As will be understood from the figure, when the amount of V added increases and becomes 0.2 mole, the life is an average 23 hours, i.e., the reliability of the capacitor is higher than when the amount added is small. Further, it could be confirmed that the life was improved over 2000-fold compared with 0 mole added.

TABLE 1

| Sample no. | 1st subcomponent Type | 1st subcomponent Moles | Firing temp. (° C.) | Dielectric constant ∈ | Specific resistance ρ (Ω cm) | Temperature coefficient of capacitance $\Delta C_{85}/C_{20}$ (ppm/° C.) | Highly accelerated life time (hours) |
|---|---|---|---|---|---|---|---|
| 1 | Comp. Ex. | V | 0 | 1300 | 235 | 1.000e+14 | −738 | 0.08 |
| 2 | Ex. | V | 0.01 | 1300 | 230 | 1.020e+14 | −710 | 0.2 |
| 3 | Ex. | V | 0.1 | 1300 | 247 | 1.130e+14 | −720 | 4.2 |
| 4 | Ex. | V | 0.2 | 1220 | 240 | 2.840e+13 | −731 | 184 |
| 5 | Ex. | V | 1.8 | 1220 | 225 | 3.000e+12 | −780 | 763 |
| 6 | Comp. Ex. | V | 2 | 1220 | —* | —* | —* | —* | where, m of main component = 0.985, x of main component = 0.36, y = 0, number of moles of second subcomponent ($MnCO_3$) converted to Mn = 0.37 mole, number of moles of third subcomponent ($SiO_2$ + CaO) = (0.4 + 0.4) mole, number of moles of fourth subcomponent ($Y_2O_3$) converted to Y = 0.07 mole,
* = semiconductive.

TABLE 2

| Sample no. | 1st subcomponent Type | 1st subcomponent Moles | Firing temp. (° C.) | Dielectric constant ε | Specific resistance ρ (Ω cm) | Temperature coefficient of capacitance $\Delta C_{85}/C_{20}$ (ppm/° C.) | Highly accelerated life time (hours) |
|---|---|---|---|---|---|---|---|
| 7 | Comp. Ex. | V | 0 | 1380 | 215 | 2.000e+14 | −832 | <0.01 |
| 8 | Ex. | V | 0.01 | 1380 | 223 | 2.500e+13 | −853 | 0.1 |
| 9 | Ex. | V | 0.05 | 1380 | 220 | 4.000e+13 | −850 | 0.35 |
| 10 | Ex. | V | 0.1 | 1380 | 230 | 1.000e+14 | −880 | 2.3 |
| 11 | Ex. | V | 0.2 | 1380 | 210 | 5.000e+13 | −890 | 23 |
| 12 | Ex. | V | 1.8 | 1380 | 212 | 2.000e+12 | −908 | 78 |
| 13 | Comp. Ex. | V | 2 | 1380 | —* | —* | —* | —* | where, m of main component = 1.02, x of main component = 0.36, y = 0, number of moles of second subcomponent ($MnCO_3$) converted to Mn = 0.37 mole, number of moles of third subcomponent ($SiO_2$ + CaO) = (2.5 + 2.5) moles, number of moles of fourth subcomponent ($Y_2O_3$) converted to Y = 0 mole, * = semiconductive.

TABLE 3

| Sample no. | | Main component (m) | Firing temp. (° C.) | Dielectric constant ε | Specific resistance ρ (Ω cm) | Temperature coefficient of capacitance $\Delta C_{85}/C_{20}$ (ppm/° C.) | Highly accelerated life time (hours) |
|---|---|---|---|---|---|---|---|
| 14 | Comp. Ex. | 0.94 | 1220 | —* | —* | —* | —* |
| 15 | Ex. | 0.985 | 1200 | 214 | 1.000e+14 | −534 | 129 |
| 16 | Ex. | 1.02 | 1380 | 226 | 2.000e+14 | −842 | 2.2 |
| 17 | Comp. Ex. | 1.08 | 1380 | — | — | — | — | where, x of main component = 0.36, y = 0, number of moles of first subcomponent ($V_2O_5$) converted to V = 0.1 mole, number of moles of second subcomponent ($MnCO_3$) converted to Mn = 0.37 mole, number of moles of third subcomponent ($SiO_2$ + CaO) = (2.5 + 2.5) moles, number of moles of fourth subcomponent ($Y_2O_3$) converted to Y = 0.07 mole, * = semiconductive, ** = densification not possible.

The numbers of moles of the first to fourth subcomponents in Table 1 to Table 3 are ratios with respect to 100 moles of the main component. In Table 1 to Table 3, in the values for the specific resistance (ρ), "mE+n" means "m×10$^{+n}$".

From the results shown in Table 1 to Table 3, the following will be understood regarding the amount of the first subcomponent added. If no V at all is added as in Sample 1 and Sample 7, the highly accelerated life time is extremely short. Further, if the amount of V added is 2 moles as in Sample 6 and Sample 13, the dielectric becomes semiconductive and the insulation resistance is insufficient.

As opposed to this, with each of Samples 2 to 5 and 8 to 12 containing predetermined amounts of the first subcomponent, it was confirmed that a dielectric ceramic composition was obtained which had a sufficient dielectric constant and insulation resistance, was not reduced even if fired in a reducing atmosphere, was free from oxidation of the nickel of the material of the internal electrodes, and was superior in capacity-temperature characteristic and it was confirmed that the highly accelerated life time could be improved. Instead of $V_2O_5$, $MoO_3$, $WO_3$, $Ta_2O_5$ and $Nb_2O_5$ were respectively added and evaluations made under similar conditions to the above. In all cases, substantially the same results were obtained.

Note that Samples 2 to 5 and Samples 8 to 12 show examples of the present invention, while Samples 1, 6, 7, and 13 show comparative examples of the present invention.

From the results shown in Table 3, the following will be understood regarding the ratio of m of the main component. When m=0.94 as in Sample 14, it was confirmed that the dielectric was reduced by the firing in a reducing atmosphere, a sufficient insulation resistance was not obtained, and the device failed to act as a capacitor. Further, when m=1.08 as in Sample 17, even if a predetermined amount of the first subcomponent is contained and firing conducted at 1380° C. (high temperature), a dense sintered body cannot be obtained.

Note that Samples 15 and 16 show examples of the present invention, while Samples 14 and 17 show comparative examples of the present invention.

EXAMPLE 2

Aside from making the m of the main component 1.02, x 0.36, y 0, the number of moles of the first subcomponent (V) 0.1 mole, the number of moles of the third subcomponent ($SiO_2$+CaO) (2.5+2.5) moles, and the number of moles of the fourth subcomponent (Y) 0.07 mole, the amount of $MnCO_3$ added as the second subcomponent (converted to Mn) was changed as shown in Table 4 for the evaluation. The results are shown in Table 4.

TABLE 4

| Sample no. | 2nd subcomponent Type | 2nd subcomponent Moles | Firing temp. (°C.) | Dielectric constant ε | Specific resistance ρ (Ω cm) | Temperature coefficient of capacitance $\Delta C_{85}/C_{20}$ (ppm/°C.) | Highly accelerated life time (hours) | Initial IR defect rate (%) |
|---|---|---|---|---|---|---|---|---|
| 18 Ex. | Mn | 0 | 1380 | 215 | 8.50e+12 | −610 | 0.02 | 90 |
| 19 Ex. | Mn | 0.05 | 1380 | 217 | 9.62e+12 | −625 | 0.1 | 82 |
| 20 Ex. | Mn | 0.37 | 1380 | 226 | 2.00e+14 | −841 | 2.2 | 23 |
| 21 Ex. | Mn | 0.73 | 1380 | 221 | 6.88e+13 | −1236 | 13 | 10 |
| 22 Ex. | Mn | 1.5 | 1380 | 210 | 2.00e+13 | −1676 | 20 | 7 |
| 23 Ex. | Mn | 3.8 | 1380 | 205 | 1.30e+12 | −1846 | 32 | 8 |
| 24 Comp. Ex. | Mn | 4 | 1380 | 198 | <1.00E+12 | −1994 | Poor | Poor | where, m of main component = 1.02, x of main component = 0.36, y = 0, number of moles of first subcomponent ($V_2O_5$) converted to V = 0.1 mole, number of moles of third subcomponent ($SiO_2$ + CaO) = (2.5 + 2.5) moles, number of moles of fourth subcomponent ($Y_2O_3$) converted to Y = 0.07 mole.

As shown in Table 4, if the amount of the second subcomponent (converted to Mn) added is 4 moles, the initial insulation resistance falls. With an amount of the second subcomponent added in the range of 0 mole ≦ second subcomponent < 4 mole, it could be confirmed that the larger the amount added (3.8 moles), the better the HALT (Highly Accelerated Life Time) and the smaller the defect rate of the initial insulation resistance, while the smaller the amount added (0 mole), the smaller the rate of change of the temperature coefficient of capacitance.

Note that the value of the initial IR defect rate is a percentage obtained by finding the specific resistance ρ of about 100 capacitor samples from the insulation resistance IR and the electrode area and thickness of dielectric layers (in the present embodiment, 4 μm) and dividing the number of the samples with values of the specific resistance ρ more than one order smaller than the value in the bulk state by the total number of samples. The smaller the value, the lower the defect rate of the initial insulation resistance and the greater the number of good capacitors.

Figure 5:
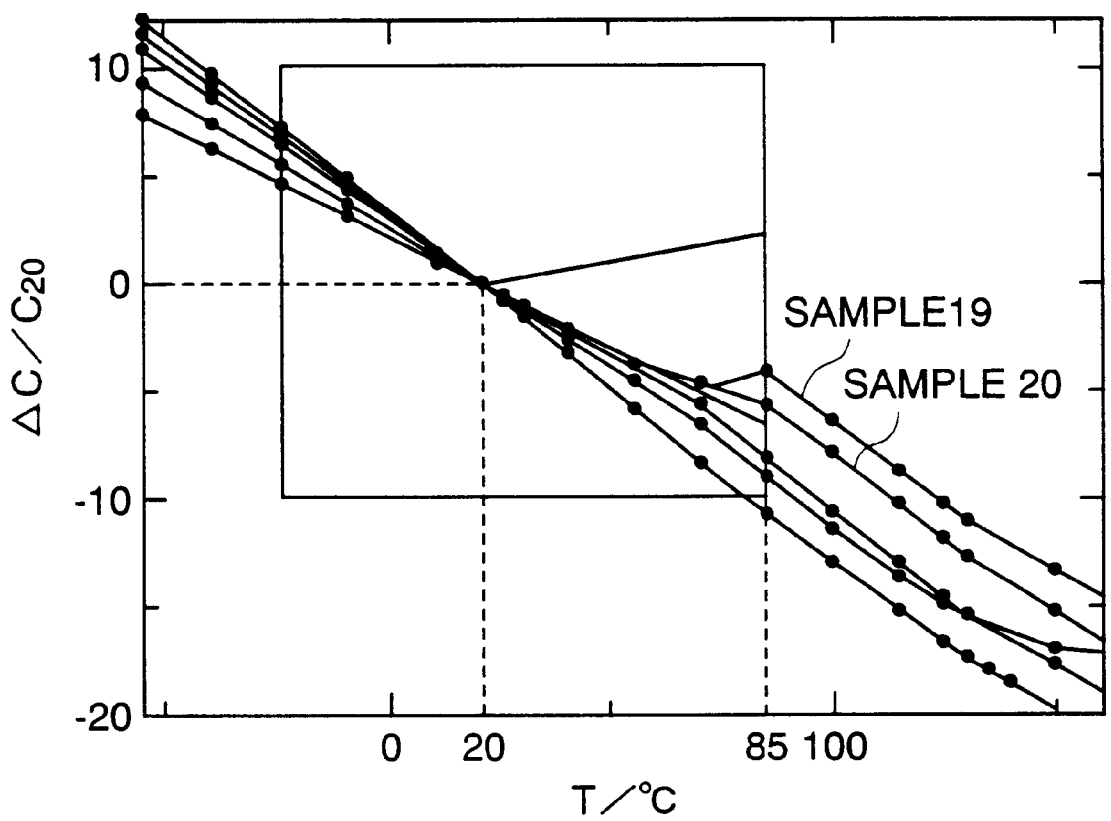
FIG. 5 is a graph of the capacity-temperature characteristic of Samples 19 and 20 according to embodiments of the present invention.

The rate of change of capacity ΔC/C in the temperature range of −50° C. to +150° C. was measured for Samples 19 and 20 and the result graphed in FIG. 5. The figure shows the rate of change based on the capacity at 20° C. As clear from the figure, a good capacity-temperature characteristic is shown in both Samples 19 and 20.

Note that instead of $MnCO_3$, MnO was added and an evaluation conducted under similar conditions as above, but in all cases the same results were obtained.

EXAMPLE 3

In addition to making the m of the main component 0.985, x 0.36, y 0, the number of moles of the first subcomponent (converted to V) 0.2 mole, the number of moles of the second subcomponent (converted to Mn) 0.37, and the number of moles of the fourth subcomponent (converted to Y) 0.07 mole, the amount of the third subcomponent ($SiO_2$+ CaO) added was changed as shown in Table 5 and the degree of improvement of the highly accelerated life time was tested. The results are shown in Table 5.

TABLE 5

| Sample no. | 3rd subcomponent Type | 3rd subcomponent Moles | Firing temp. (°C.) | Dielectric constant ε | Specific resistance ρ (Ω cm) | Temperature coefficient of capacitance $\Delta C_{85}/C_{20}$ (ppm/°C.) | Highly accelerated life time (hours) | Initial IR defect rate (%) |
|---|---|---|---|---|---|---|---|---|
| 4-1 Comp. Ex. | $SiO_2$ + CaO | 0 | 1380 | —** | —** | —** | —** | —** |
| 4 Ex. | $SiO_2$ + CaO | 0.4 + 0.4 | 1220 | 240 | 2.84e+13 | −731 | 184 | 64 |
| 4-2 Ex. | $SiO_2$ + CaO | 2.5 + 2.5 | 1220 | 219 | 3.73e+13 | −853 | 220 | 72 |
| 4-3 Ex. | $SiO_2$ + CaO | 4 + 4 | 1220 | 222 | 3.50e+13 | −873 | 232 | 75 |
| 4-4 Ex. | $SiO_2$ + CaO | 5 + 5 | 1220 | 193 | 2.50e+13 | −908 | 168 | 73 |
| 4-5 Ex. | $SiO_2$ + CaO | 6.8 + 6.8 | 1220 | 182 | 8.00e+12 | −987 | 135 | 88 |
| 4-6 Comp. Ex. | $SiO_2$ + CaO | 7.5 + 7.5 | 1220 | 175 | 2.00e+12 | −1035 | 98 | 85 | where, m of main component = 0.985, x of main component = 0.36, y = 0, number of moles of first subcomponent ($V_2O_5$) converted to V = 0.2 mole, number of moles of second subcomponent ($MnCO_3$) converted to Mn = 0.37 mole, number of moles of fourth subcomponent ($Y_2O_3$) converted to Y = 0.07 mole, ** = densification not possible.

As shown in Table 5, it could be confirmed that by making the amount of the third subcomponent added more than 0 mole, the sinterability is improved. It could be confirmed that by making the amount of addition less than 15 moles, the decline in the dielectric constant could be suppressed and a sufficient capacity could be secured. Note that the value of the defect rate of the initial insulation resistance was found in the same way as in Example 2.

Note that similar results could be obtained using $CaSiO_3$ instead of ($SiO_2$+CaO).

EXAMPLE 4

Figure 6:
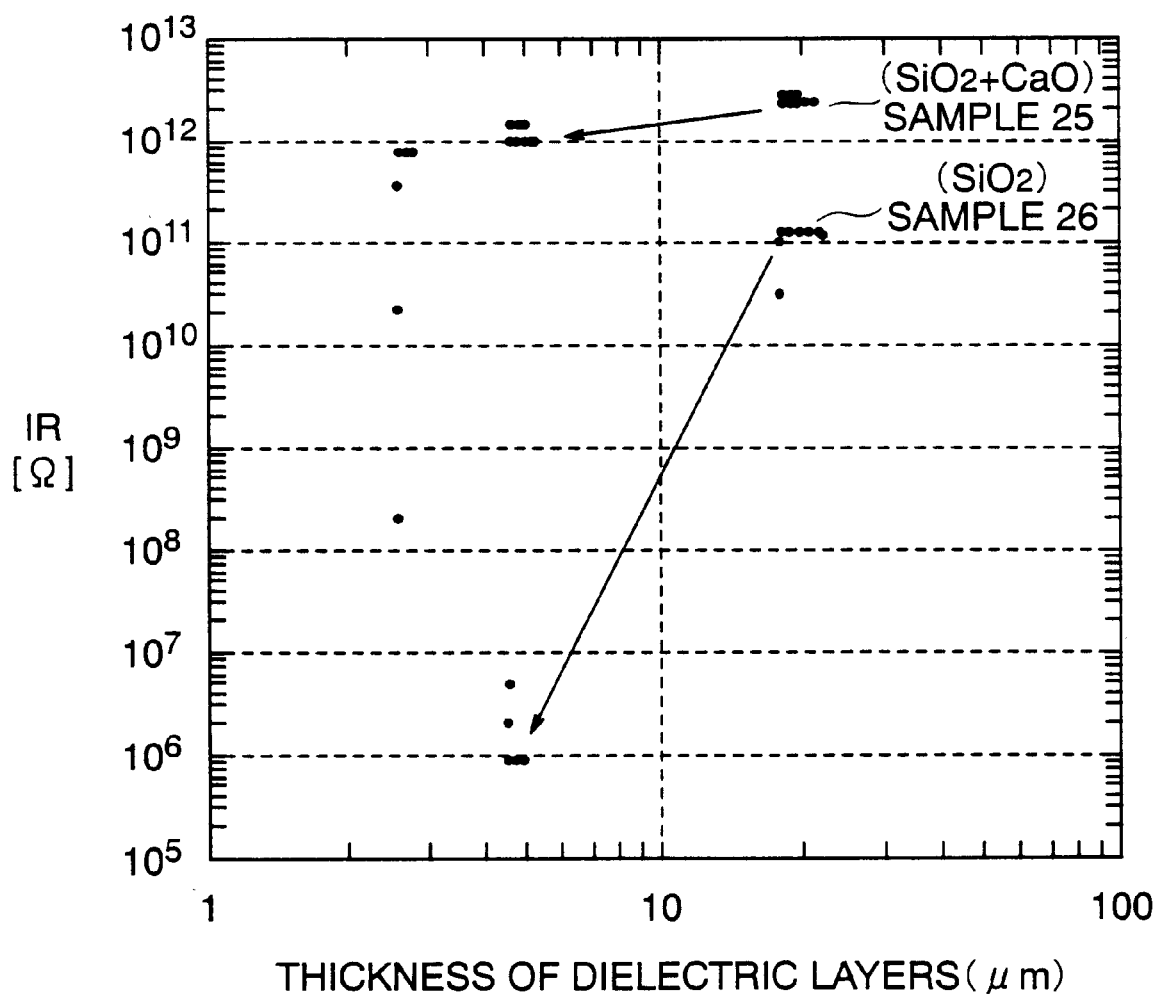
FIG. 6 is a graph of the relation between the thickness of dielectric layers and the initial insulation resistance when changing the type of the third subcomponent.

Aside from making the thickness of the dielectric layers different as shown in FIG. 6, the same procedure was followed as in Sample 20 of Example 2 shown in Table 4 to prepare several capacitor samples (Sample 25). Further, aside from using of $SiO_2$ as the third subcomponent and making the thickness of the dielectric layers different as shown in FIG. 6, the same procedure was followed as in Sample 20 of Example 2 shown in Table 4 to prepare several capacitor samples (Sample 26).

A test was conducted using these capacitor samples to confirm the effect of the type of the third subcomponent on the initial insulation resistance (IR) when making the dielectric layers thin. The results are shown in FIG. 6. As will be understood from that figure, it could be confirmed that use of ($SiO_2$+CaO) as the third subcomponent resulted in less variation in the initial insulation resistance (IR) even when making the dielectric layers thin. Note that similar results could be obtained using $CaSiO_3$ instead of ($SiO_2$+CaO).

EXAMPLE 5

Figure 7A:
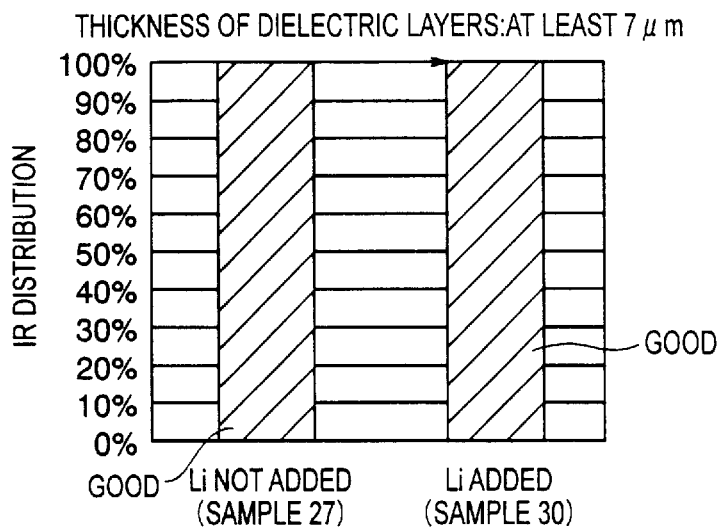
FIG. 7A to FIG. 7C are a graph of the relation between the addition of Li and the defect rate of the initial insulation resistance when changing the thickness of the dielectric layers.
Figure 7B:
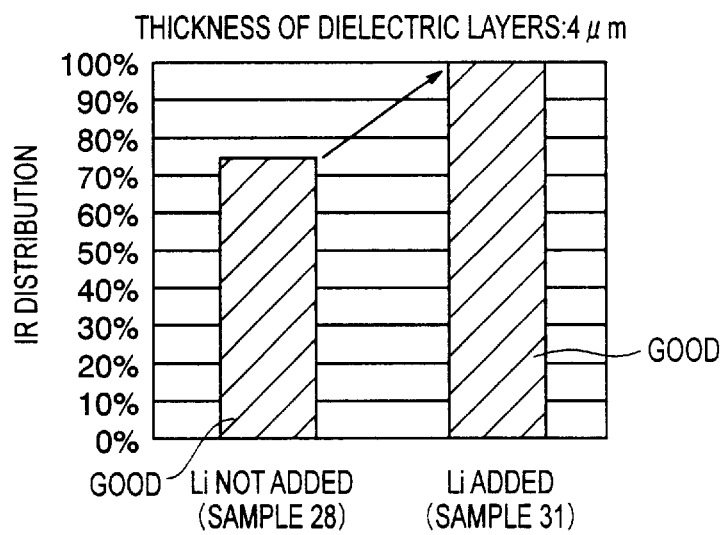
Figure 7C:
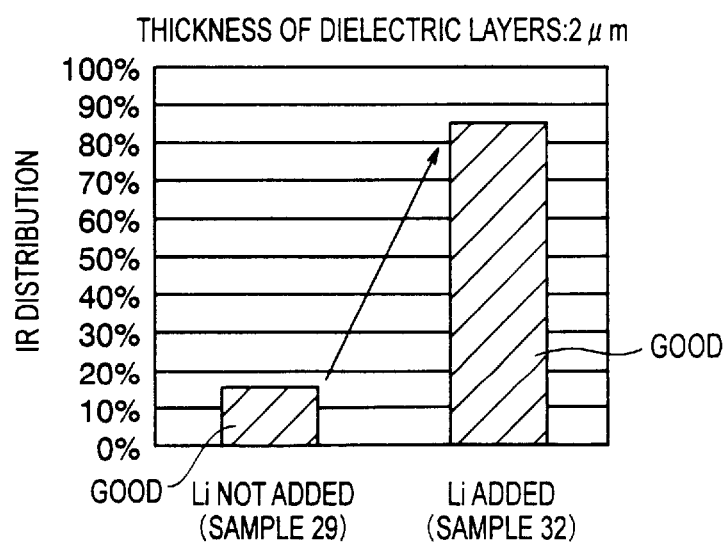

Aside from making the thickness of the dielectric layers at least 7 μm, 4 μm, and 2 μm, the same procedure was followed as with Sample 20 of Example 2 shown in Table 4 to prepare several capacitor samples (Samples 27 to 29). Further, aside from further adding 1.4 moles of $Li_2O$ to the ($SiO_2$+CaO) of the third subcomponent and making the thickness of the dielectric layers at least 7 μm, 4 μm, and 2 μm, the same procedure was followed as with Sample 20 of Example 2 shown in Table 4 to prepare several capacitor samples (Samples 30 to 32) and the defect rate of the initial insulation resistance (IR) of each sample was calculated. The results are shown in FIG. 7A to FIG. 7C. Even if $Li_2O$ is added, when the thickness is a thick one of over 7 μm, there is no effect on the defect rate (see FIG. 7A). As the thickness becomes smaller, for example, 4 μm and 2 μm, it was confirmed that the effect of addition of $Li_2O$ is manifested (see FIGS. 7B to 7C). Note that the value of the defect rate of the initial insulation resistance was found in the same way as in Example 2.

EXAMPLE 6

Aside from making the amount of addition of the third subcomponent ($SiO_2$+CaO) 5.0 moles, the same procedure was followed as with Sample 3 of Example 1 shown in Table 1 to prepare a capacitor sample (Sample 33). Further, aside from not adding Y as the fourth subcomponent and making the amount of the third subcomponent ($SiO_2$+CaO) added 5.0 moles, the same procedure was followed as with Sample 3 of Example 1 shown in Table 1 to prepare a capacitor sample (Sample 34).

Figure 8:
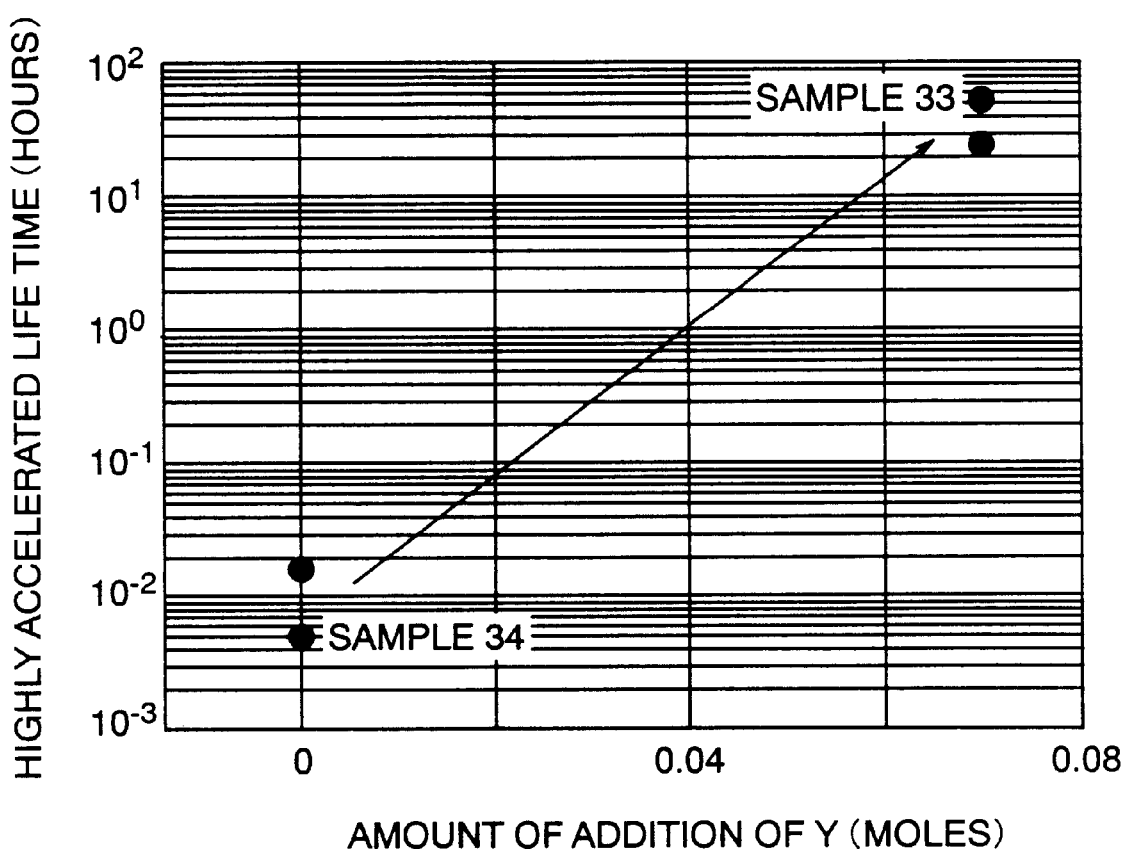
FIG. 8 is a graph of the relation between the addition of Y as a fourth subcomponent and the highly accelerated life time.

A test was conducted using these capacitor samples to confirm the effect of the addition of Y as the fourth subcomponent on the highly accelerated life time. The results are shown in FIG. 8. As will be understood from that figure, it could be confirmed that addition of Y enabled an improvement of the highly accelerated life time.

EXAMPLE 7

Figure 9A:
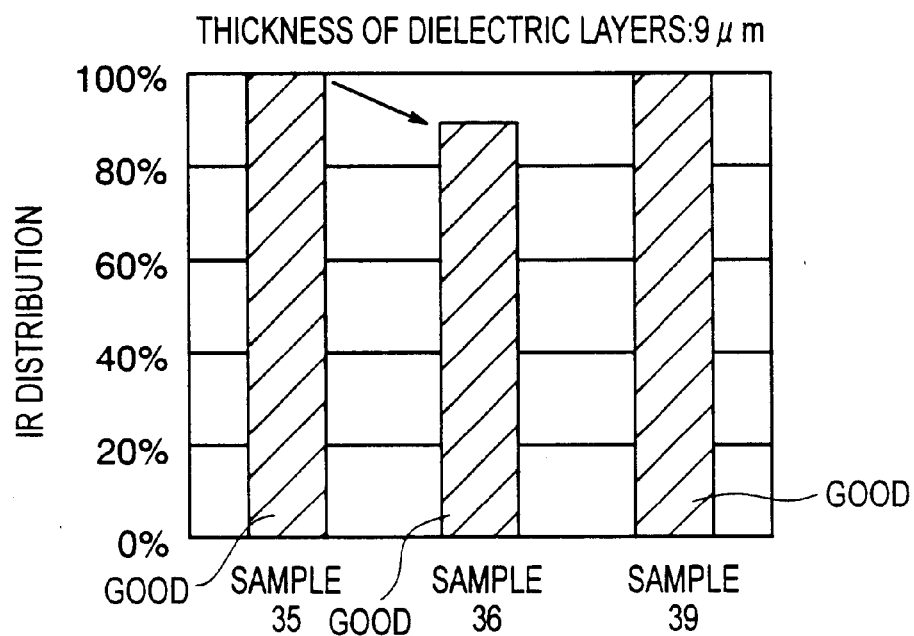
FIG. 9A and FIG. 9B are a graph of the relation between the oxygen partial pressure in the heat treatment step and the defect rate of the initial insulation resistance.
Figure 9B:
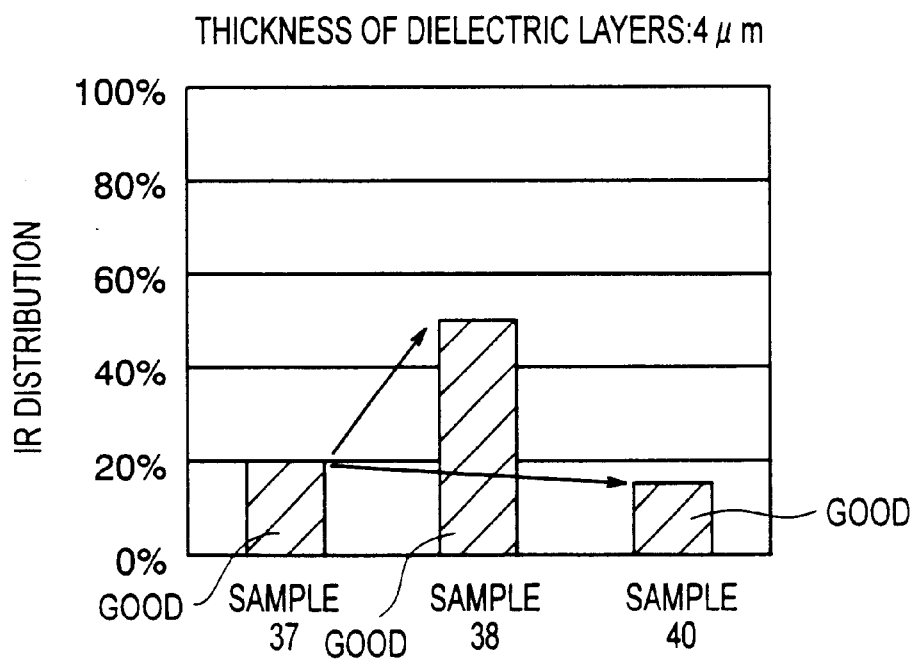

Aside from making the oxygen partial pressure in the heat treatment step $3.54\times10^{-2}$ Pa (900° C., 9 hours, wetter temperature 35° C.) and $4.23\times10^{-1}$ Pa (1100° C., 3 hours, wetter temperature 35° C.) and making the thickness of the dielectric layers 9 μm (Samples 35 and 36) and 4 μm (Samples 37 and 38), the same procedure was followed as with Sample 4 of Example 1 shown in Table 1 to prepare several samples and the defect rates of the initial insulation resistance (IR) of the samples were calculated. The results are shown in FIG. 9A and FIG. 9B. It could be confirmed that when the thickness of the dielectric layers was made a thick 9 μm, the difference in the oxygen partial pressure did not have any effect on the defect rate (see FIG. 9A) and that when the thickness was made a thin 4 μm, an effect appeared when adjusting the oxygen partial pressure to at least $10^{-4}$ Pa (note that this is also in the range of $10^{-1}$ to 10 Pa), that is, $4.23\times10^{-1}$ Pa (Sample 38) (see FIG. 9B). The value of the defect rate of the initial insulation resistance was found in the same way as in Example 2.

Note that it was attempted to confirm the effect of reduction of the defect rate of the initial insulation resistance in the same way for Samples 35 and 36 and Samples 37 and 38 by making the oxygen partial pressure in the heat treatment step $9.61\times10^{-2}$ Pa (1100°, 3 hours, wetter temperature 0° C.) (Samples 39 and 40), but such an effect could not be particularly confirmed. From this, it is believed that the holding temperature during heat treatment does not contribute to a reduction in the defect rate of the initial insulation resistance and that the oxygen partial pressure during heat treatment is the contributory factor.

EXAMPLE 8

Aside from making the third subcomponent ($SiO_2$+CaO)=(0.4+0.4) mole (p=0), ($SiO_2$+CaO+SrO)=(0.4+0.2+0.2) mole (p=0.5), and ($SiO_2$+SrO)=(0.4+0.4) mole (p=1) and performing the annealing at a holding temperature of 1100° C., a temperature holding time of 3 hours, and a wet $N_2$ gas atmosphere (oxygen partial pressure of $4.23\times10^{-1}$ Pa), the same procedure was followed as with Sample 4 to prepare several capacitor samples (Samples 41, 42, and 43). Further, what kind of effect the content of Sr in the $(Sr_p,Ca_{1-p})SiO_3$ of the third subcompoonent had on the non-defect rate of the initial insulation resistance (IR) in the capacitor samples was evaluated. The results are shown in FIG. 10.

Figure 10:
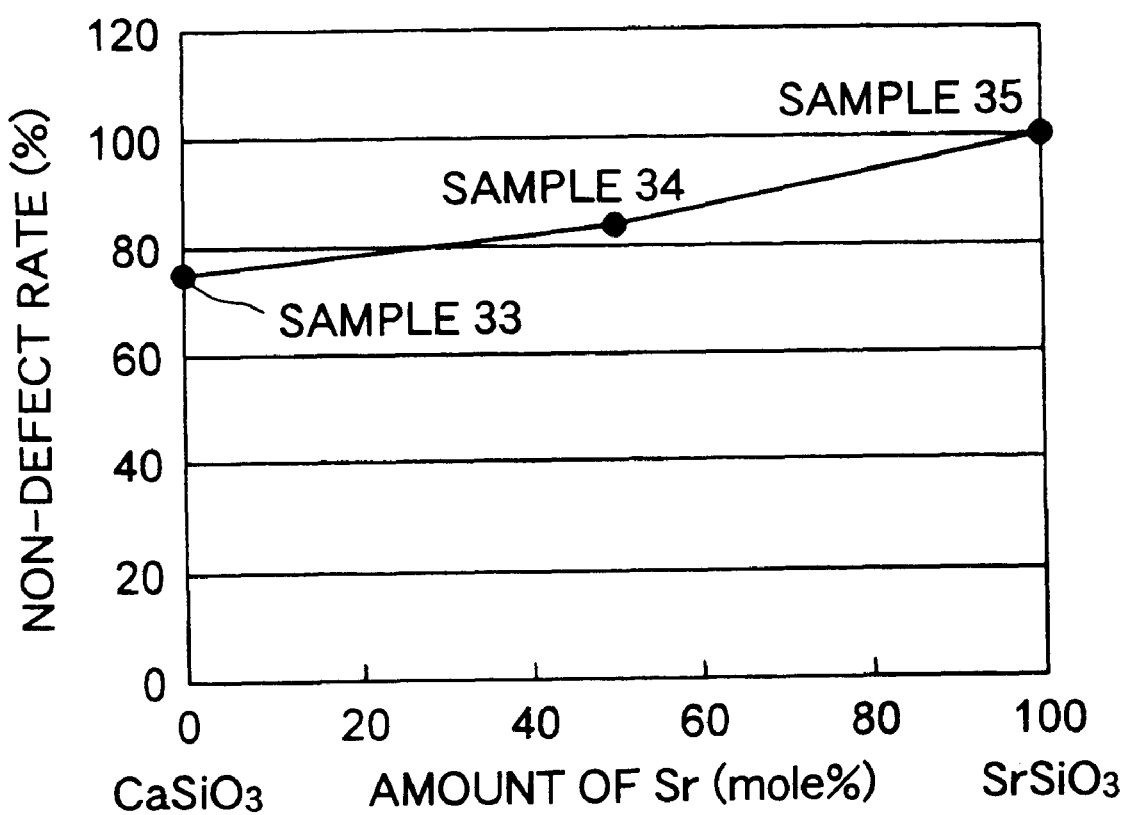
FIG. 10 is a graph of the relation between the ratio of content of Sr in the $(Sr_p, Ca_{1-p})SiO_3$ of the third subcomponent and the non-defective rate of the initial insulation resistance (IR) of capacitor samples.

From the results of FIG. 10, it could be confirmed that the greater the content of the Sr, the better the non-defect rate of the initial insulation resistance, i.e., 75 percent (Sample 41), 83 percent (Sample 42), and 100 percent (Sample 43), that is, the lower the defect rate of the initial IR, that is, 25 percent, 17 percent, and 0 percent. Note that the value of the defect rate of the initial insulation resistance was found in the same way as in Example 2.

What is claimed is:

1. A dielectric ceramic composition comprising at least
    a main component containing a dielectric oxide of a composition expressed by $\{(Sr_{1-x}Ca_x)O\}_m \cdot (Ti_{1-y}Zr_y)O_2$;
    a first subcomponent containing at least one type of compound selected from oxides of V, Nb, W, Ta, and Mo and/or compounds forming these oxides after firing, wherein
    the symbols m, x, and y showing the molar ratio of the composition in the formula contained in the main component are in relations of
    $0.94 < m < 1.08$,
    $0 \leq x 1.00$, and
    $0 \leq y \leq 0.20$ and
    the ratio of the first subcomponent with respect to 100 moles of the main component, which is converted to the metal element in the oxide, is $0.01$ mole $\leq$ first subcomponent $< 2$ moles; and
    a third subcomponent containing $(Sr_p, Ca_{1-p}) SiO_3$, where p is $0.3 \leq p \leq 1$, wherein
    the ratio of the third subcomponent with respect to 100 moles of the main component, which is converted to oxide, is 0 mole $<$ third subcomponent $<15$ moles.

2. A dielectric ceramic composition comprising at least
a main component containing a dielectric oxide of a composition expressed by $\{(Sr_{1-x}Ca_x)O\}_m \cdot (Ti_{1-y}Zr_y)O_2$;
a first subcomponent containing at least one type of compound selected from oxides of V, Nb, W, Ta, and Mo and/or compounds forming these oxides after firing, wherein
the symbols m, x, and y showing the molar ratio of the composition in the formula contained in the main component are in relations of
$0.94 < m < 1.08$,
$0 \leq x \leq 1.00$, and
$0 \leq y \leq 0.20$ and
the ratio of the first subcomponent with respect to 100 moles of the main component, which is converted to the metal element in the oxide, is 0.01 mole $\leq$ first subcomponent $<2$ moles;
a second subcomponent containing an oxide of Mn and/or a compound forming an oxide of Mn after firing, wherein
the ratio of the second subcomponent with respect to 100 moles of the main component, which is converted to the metal element in the oxide, is 0 mole $\leq$ second subcomponent $<4$ moles; and
a third subcomponent containing $(Sr_p,Ca_{1-p})SiO_3$, where p is $0.3 \leq p \leq 1$, wherein
the ratio of the third subcomponent with respect to 100 moles of the main component, which is converted to oxide, is 0 mole $<$ third subcomponent $<15$ moles.

3. A dielectric ceramic composition comprising at least
a main component containing a dielectric oxide of a composition expressed by $\{(Sr_{1-x}Ca_x)O\}_m \cdot (Ti_{1-y}Zr_y)O_2$;
a first subcomponent containing at least one type of compound selected from oxides of V, Nb, W, Ta, and Mo and/or compounds forming these oxides after firing, wherein
the symbols m, x, and y showing the molar ration of the composition in the formula contained in the main component are in relation of
$0.94 < m < 1.80$,
$0 \leq x \leq 1.00$, and
$0 \leq y \leq 0.20$ and
the ratio of the first subcomponent with respect to 100 moles of the main
component, which is converted to the metal element in the oxide, is 0.01 mole $\leq$ first subcomponent $<2$ moles; and
a third subcomponent containing $(Sr_p, Ca_{1-})SiO_3$, where p is $0.3 \leq p \leq 1$, wherein
the ratio of the third subcomponent with respect to 100 moles of the main component, which is converted to oxide, is 0 mole $<$ third subcomponent $<15$ moles and
wherein the rate of change of the electrostatic capacity with respect to temperature $\Delta C$ is $-2000$ ppm/° C. to 0 ppm/° C. at least in the temperature range of 20° C. to 85° C., where the reference temperature of the electrostatic capacity C is 20° C.

4. A dielectric ceramic composition comprising at least
a main component containing a dielectric oxide of a composition expressed by $\{(Sr_{1-x}Ca_x)O\}_m \cdot (Ti_{1-y}Zr_y)O_2$;
a first subcomponent containing at least one type of compound selected from oxides of V, Nb, W, Ta, and Mo and/or compounds forming these oxides after firing, wherein
the symbols m, x, and y showing the molar ratio of the composition in the formula contained in the main component are in relations of
$0.94 < m < 1.08$,
$0 \leq x \leq 1.00$, and
$0 \leq y \leq 0.20$ and
the ratio of the first subcomponent with respect to 100 moles of the main component, which is converted to the metal element in the oxide, is 0.01 mole $\leq$ first subcomponent $<2$ moles;
a second subcomponent containing an oxide of Mn and/or a compound forming an oxide of Mn after firing, wherein
the ratio of the second subcomponent with respect to 100 moles of the main component, which is converted to the metal element in the oxide, is 0 mole $\leq$ second subcomponent $<4$ moles; and
a third subcomponent containing $(Sr_p,Ca_{1-p})SiO_3$, where p is $0.3 \leq p \leq 1$, wherein
the ratio of the third subcomponent with respect to 100 moles of the main component, which is converted to oxide, is 0 mole $<$ third subcomponent $<15$ moles and
wherein the rate of change of the electrostatic capacity with respect to temperature $\Delta C$ is $-2000$ ppm/° C. to 0 ppm/° C. at least in the temperature range of 20° C. to 85° C., where the reference temperature of the electrostatic capacity C is 20° C.

5. An electronic device having a dielectric layer, wherein
said dielectric layer is comprised of a dielectric ceramic composition and
said dielectric ceramic composition comprises at least
a main component containing a dielectric oxide of a composition expressed by $\{(Sr_{1-x}Ca_x)O\}_m \cdot (Ti_{1-y}Zr_y)O_2$ and
a first subcomponent containing at least one type of compound selected from oxides of V, Nb, W, Ta, and Mo and/or compounds forming these oxides after firing, wherein
the symbols m, x, and y showing the molar ratio of the composition in the formula contained in the main component are in relations of
$0.94 < m < 1.08$,
$0 \leq x \leq 1.00$, and
$0 \leq y \leq 0.20$ and
the ratio of the first subcomponent with respect to 100 moles of the main component, which is converted to the metal element in the oxide, is 0.01 mole first subcomponent $<2$ moles; and
a capacitor device body is comprised of said dielectric layers and internal electrode layers alternately stacked , wherein a conductive material contained in said internal electrode layers is a base metal.

6. A method of producing an electronic device comprising the steps of
preparing a dielectric paste using a dielectric ceramic composition comprising at least
a main component containing a dielectric oxide of a composition expressed by $\{(Sr_{1-x}Ca_x)O\}_m \cdot (Ti_{1-y}Zr_y)O_2$ and
a first subcomponent containing at least one type of compound selected from oxides of V, Nb, W, Ta, and Mo and/or compounds forming these oxides after firing, wherein the symbols m, x, and y showing the molar ratio of the composition in the formula contained in the main component are in relations of $0.94 < m < 1.08$, $0 \leq x \leq 1.00$, and $0 \leq y \leq 0.20$ and the ratio of the first subcomponent with respect to 100 moles of the main component, which is converted to the metal element in the oxide, is 0.01 mole $\leq$ first subcomponent < 2 moles;

preparing a paste for internal electrodes;

alternately stacking the dielectric paste and the internal electrode paste to obtain a multilayer body;

firing the multilayer body to obtain a sintered body; and heat treating the sintered body in an atmosphere of an oxygen partial pressure of at least $10^{-4}$ Pa, wherein a base metal is used as the internal electrode paste.

7. A method of producing an electronic device comprising the steps of preparing a dielectric paste using a dielectric ceramic composition comprising at least a main component containing a dielectric oxide of a composition expressed by $\{(Sr_{1-x}Ca_x)O\}_m \cdot (Ti_{1-y}Zr_y)O_2$ and a first subcomponent containing at least one type of compound selected from oxides of V, Nb, W, Ta, and Mo and/or compounds forming these oxides after firing, wherein the symbols m, x, and y showing the molar ratio of the composition in the formula contained in the main component are in relations of $0.94 < m < 1.08$, $0 \leq x \leq 1.00$, and $0 \leq y \leq 0.20$ and the ratio of the first subcomponent with respect to 100 moles of the main component, which is converted to the metal element in the oxide, is 0.01 mole $\leq$ first subcomponent < 2 moles;

preparing a paste for internal electrodes;

alternately stacking the dielectric paste and the internal electrode paste to obtain a multilayer body;

firing the multilayer body to obtain a sintered body; and heat treating the sintered body in an atmosphere of an oxygen partial pressure of at least $10^{-4}$ Pa, wherein in said firing step, firing the multilayer body in an atmosphere of an oxygen partial pressure of $10^{-10}$ Pa to $10^{-3}$ Pa and using, as the internal electrode paste, a base metal.

* * * * *